(12) United States Patent
Gross et al.

(10) Patent No.: US 8,122,878 B1
(45) Date of Patent: Feb. 28, 2012

(54) SOLAR CONCENTRATOR WITH CAMERA ALIGNMENT AND TRACKING

(75) Inventors: William Gross, Pasadena, CA (US); Philip Lee, Glendale, CA (US); Kevin Hickerson, Altadena, CA (US); Dylan Owens, Cambridge, MA (US); Peter Polidoro, Riner, VA (US)

(73) Assignee: Energy Innovations, Inc., Poway, CA (US)

( * ) Notice: Subject to any disclaimer, the term of this patent is extended or adjusted under 35 U.S.C. 154(b) by 82 days.

(21) Appl. No.: 11/974,683

(22) Filed: Oct. 15, 2007

Related U.S. Application Data

(60) Provisional application No. 60/853,253, filed on Oct. 20, 2006.

(51) Int. Cl.
*F24J 2/38* (2006.01)

(52) U.S. Cl. ........ 126/600; 126/571; 126/714; 382/103; 356/390; 356/139.01

(58) Field of Classification Search .................. 356/124, 356/603, 392, 393; 126/600–608, 570–577, 126/683–685, 680, 687, 714; 136/246; 250/203.4; 353/3; *F24J 2/38*
See application file for complete search history.

(56) References Cited

U.S. PATENT DOCUMENTS 4,219,729 A * 8/1980 Smith .................... 250/203.4
(Continued)

FOREIGN PATENT DOCUMENTS

DE           3316731 A1 * 11/1984

*Primary Examiner* — Steven B McAllister
*Assistant Examiner* — Desmond Peyton
(74) *Attorney, Agent, or Firm* — Andrew S. Naglestad

(57) ABSTRACT

The invention in the preferred embodiment features a solar concentrator that can align and/or track based on images from a video camera, for example. The concentrator preferably includes one or more optical elements for directing light to a receiver, a camera for capturing an image of the optical elements, and a controller configured to: detect the orientation of the one or more optical elements from the one or more images, determine an orientation error based on the detected orientation, and automatically orient the one or more optical elements to minimize the orientation error. The optical elements generally comprise a plurality of mirrors or lenses arranged in a one or two dimensional array.

16 Claims, 15 Drawing Sheets

U.S. PATENT DOCUMENTS

| | | | |
|---|---|---|---|
| 4,564,275 A * | 1/1986 | Stone | 353/3 |
| 5,570,186 A * | 10/1996 | Satzger et al. | 356/613 |
| 5,694,479 A * | 12/1997 | Guering et al. | 382/141 |
| 5,717,781 A * | 2/1998 | Ebel et al. | 382/141 |
| 5,862,799 A * | 1/1999 | Yogev et al. | 126/578 |
| 6,072,898 A * | 6/2000 | Beaty et al. | 382/146 |
| 6,459,955 B1 * | 10/2002 | Bartsch et al. | 700/245 |
| 6,791,616 B2 * | 9/2004 | Tamaki et al. | 348/335 |
| 6,882,411 B2 * | 4/2005 | Dispenza et al. | 356/124 |
| 6,970,590 B2 * | 11/2005 | Harding | 382/152 |
| 2004/0086021 A1 * | 5/2004 | Litwin | 374/120 |
| 2005/0286045 A1 * | 12/2005 | Volfman et al. | 356/237.1 |

\* cited by examiner

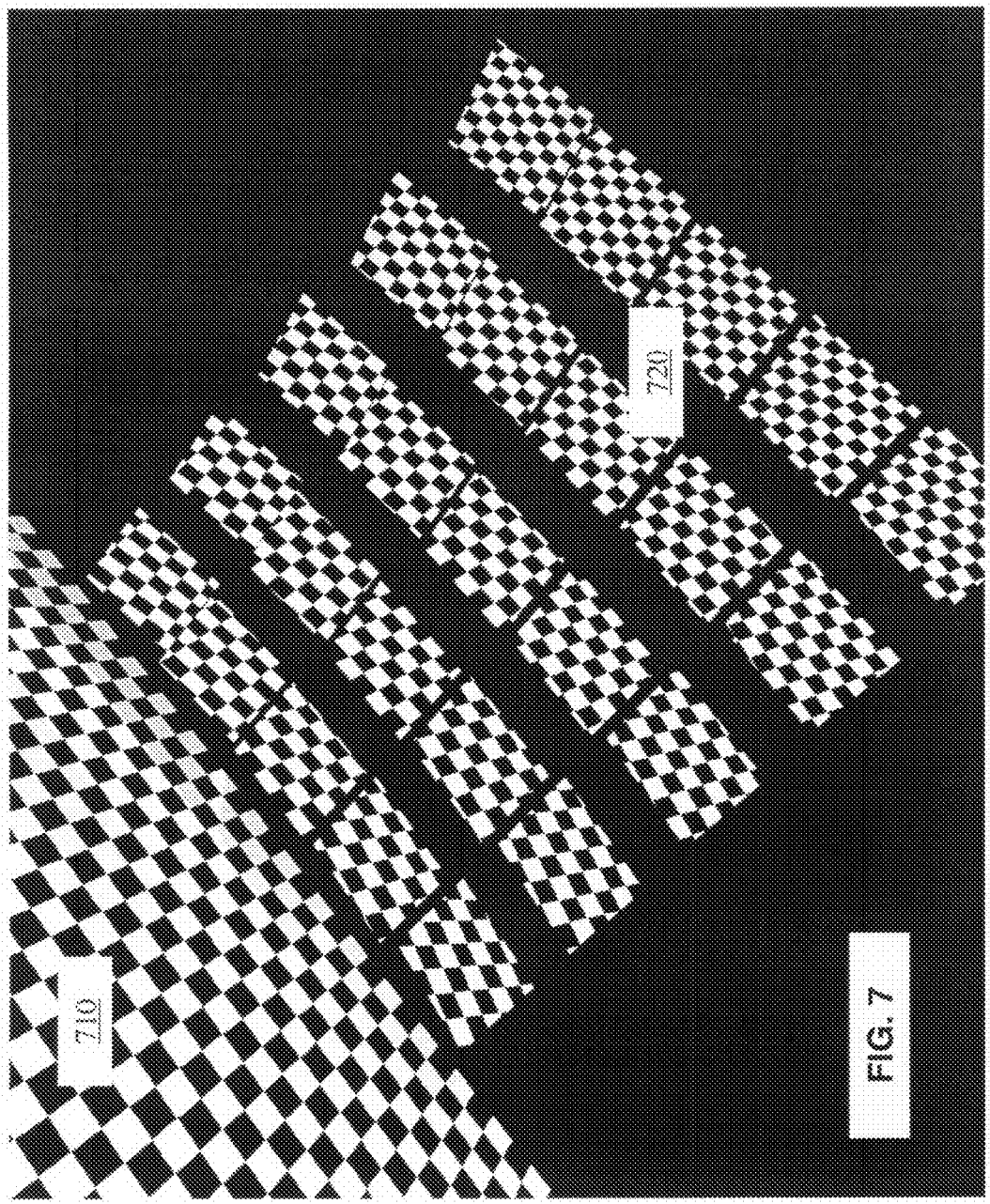

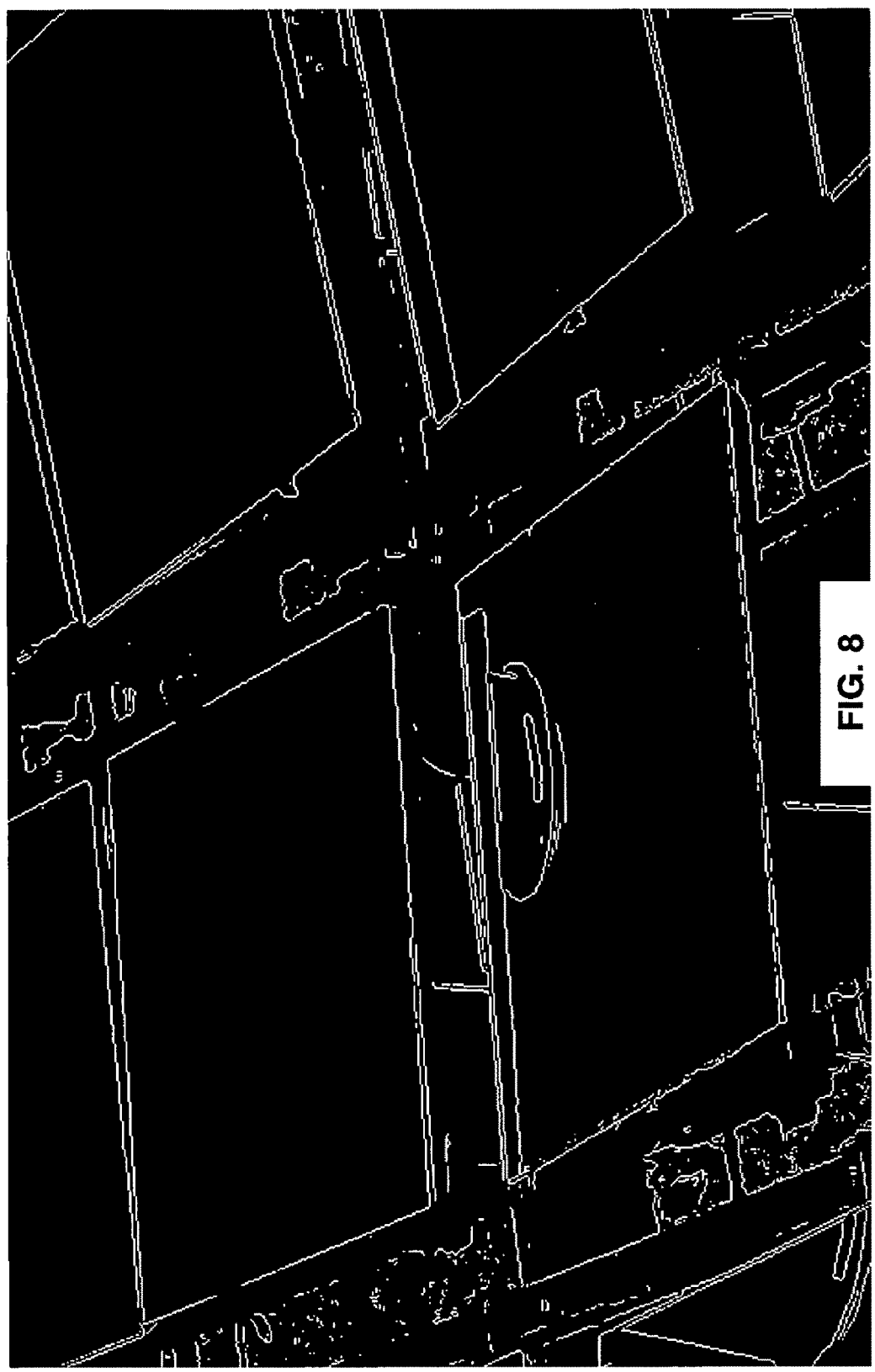

SOLAR CONCENTRATOR WITH CAMERA ALIGNMENT AND TRACKING

CROSS-REFERENCE TO RELATED APPLICATION(S)

This application claims the benefit of U.S. Provisional Patent Application Ser. No. 60/853,253 filed Oct. 20, 2006, entitled "SOLAR CONCENTRATOR WITH CAMERA ALIGNMENT AND TRACKING," which is hereby incorporated by reference herein for all purposes.

FIELD OF INVENTION

The invention relates to a solar concentrator adapted to perform mirror alignment and tracking functions using a camera. In particular, the invention in the preferred embodiment relates to a solar concentrator that process digital images of the mirrors to determine and correct the orientation of the mirrors for improved focusing.

BACKGROUND

Many solar concentrators are designed with a plurality of mirrors to direct sunlight onto a receiver that captures and converts the energy to electricity or other usable form. The mirrors are often arrayed in a one or two dimensional array. The orientation of each of the minors may be controlled by a tracking controller and actuators that update the orientation of the mirrors so that they are continually pointed toward the sun. The alignment of the mirrors is very important if the concentrator is to collect light with efficiency at or near its theoretical limit. Misalignment of the minors reduces the efficiency of the concentrator and can even damage electronic equipment. At the same time, the cost of the tracking solar concentrator must be inexpensive to ensure solar energy is competitive with electricity generated from fossil fuels, for example. There is therefore a need for a system and method for accurately aligning the mirrors when the concentrator is manufactured and while the mirrors are tracking the sun.

SUMMARY

The invention in the preferred embodiment features a solar concentrator that can align and/or track based on images from a video camera or other two dimensional imager. The concentrator preferably includes one or more optical elements for directing light to a receiver, a camera for capturing an image of the optical elements, and a controller configured to: detect the orientation of the one or more optical elements from the one or more images, determine an orientation error based on the detected orientation, and automatically orient the one or more optical elements to minimize the orientation error. The optical elements generally comprise a plurality of mirrors or lenses arranged in a one or two dimensional array. The mirrors and/or lenses are adapted to focus light onto the receiver.

The controller may be configured to determine the orientation error based on edge detection, gradient magnitude, or other technique. A reference target located at a predetermined position also may be used to generate a reflection with which to accentuate the orientation detection. The edges that are extracted from the images generally correspond to the edges of the mirrors, lenses, graphical indicia, fiducials, or a combination thereof. The determined orientation may thereafter be used to align the mirrors at the time of manufacture, during calibration, or during tracking operations.

The invention in some embodiments further includes a method of aligning the mirrors of a solar concentrator with a camera. The method includes capturing an image of the mirrors with the camera, detecting edges from the image, determining the orientation of the mirrors from the extracted edges, determining an orientation error for the mirrors based on the determined orientations, and orienting the mirrors if the orientation error exceeds a predetermined threshold. The orientations may be determined based on the edges of the mirrors alone, or based in part on the edges extracted from the image of a reference target reflected by the mirrors.

BRIEF DESCRIPTION OF THE FIGURES

FIG. 7 is a schematic illustration of an array of mirrors and the reflection of a reference target therein as observed by an alignment camera, in accordance with a preferred embodiment;

FIG. 8 is an illustration of an image of an array of mirrors after edge detection processing, in accordance with a preferred embodiment;

DESCRIPTION OF THE PREFERRED EMBODIMENT

Figure 1:
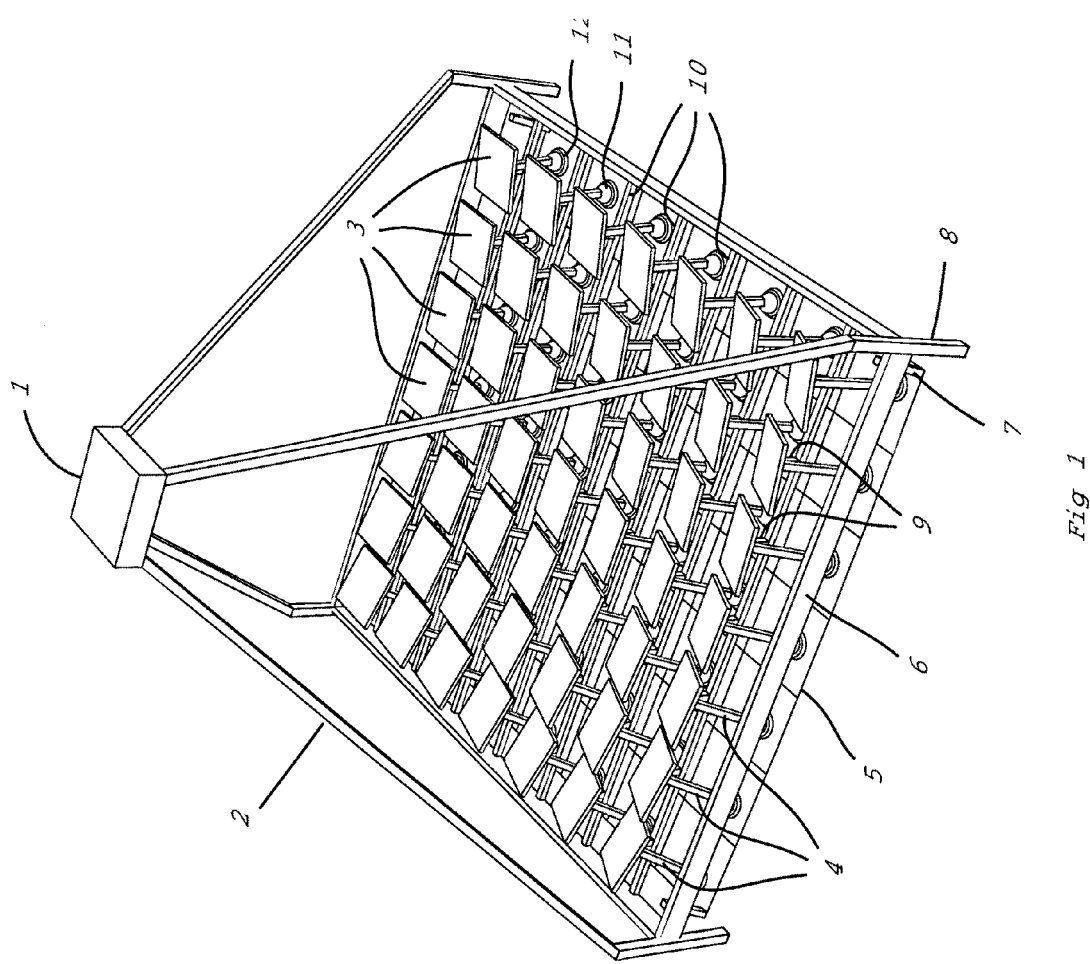
FIG. 1 is a perspective view of a heliostat using a rigid positioning plate to simultaneously orient a plurality of mirrors using simple parallel translation, in accordance with the preferred embodiment.

Illustrated in FIG. 1 is an exemplary solar concentrator with which camera-based alignment and camera-based tracking of the preferred embodiment may be implemented. The concentrator is a heliostat array adapted to reflect sunlight to a target or receiver with a plurality of lenses or reflectors, each of which is simultaneously oriented by a positioning plate.

The positioning plate is adapted to aim or otherwise orient each of the plurality of reflectors in a direction bisecting the interior angle between the source of the radiation and the receiver, thereby mapping between the parallel rays associated with sun and the focused rays convergent on receiver. The positioning plate is a rigid plate with a contoured surface having a shape adapted to uniquely position each reflector in a two or three dimensional array, for example. Over the course of a day, actuation of the position plate changes the orientation of each of the mirrors depending on the position of the mirror relative to the receiver. In accordance with the preferred embodiment of the present invention, the initial orientation of the mirrors may be first aligned and the mirrors periodically adjusted thereafter to track the sun with one or more cameras. The heliostat is disclosed in U.S. patent application Ser. No. 11/058,023 filed Feb. 14, 2005 which is hereby incorporated by reference herein.

In the preferred embodiment, the array is a linked heliostat array comprising a plurality of siderostats, a positioning plate operatively coupled to each of the plurality of siderostats, and a receiver incorporated into the receiver housing 1. The plurality of siderostats in cooperation with the positioning plate 5, are adapted to reflect the incident sunlight to a common focal point coinciding with a receiver (not shown) independently of the position of the sun. Each of the plurality of siderostats includes a combination reflector and a positioning arm rotatably attached to a heliostat chassis by means of an articulated mounting structure permitting the reflector to be steered under the control of the actuated positioning plate. The positioning plate 5 is generally characterized by a non-planar surface configured to orient each of the reflectors to reflect the sunlight to the same fixed focal point as the sun sweeps across the diurnal sky, for example. The positioning plate 5 is effectively geometrically encoded with the position of each reflector as a function of the receiver position and position of the reflector within the array.

In the preferred embodiment, the reflectors are mirrors 3 that reflect incident sunlight to the receiver housing 1 and the receiver (not shown) therein. The position of the receiver and housing 1 are preferably fixed relative to the plurality of siderostats by means of receiver support arms 2. The receiver in the preferred embodiment includes a panel including one or more photovoltaic cells, associated electronics, and cooling system, although various other forms of energy converters may also be employed including thermal absorbing liquids, for example. In alternative embodiments, the receiver is selected from a group comprising a heat exchanger, heat engine, and turbine, for example.

The plurality of mirrors 3 in the preferred embodiment are arrayed two dimensionally in a horizontal or incline plane and the mirrors adapted to be rotated about two orthogonal axes. In other embodiments, the plurality of mirrors may be arrayed three dimensionally with suitable modification to the contour of the positioning plate 5. In the preferred embodiment, each of the siderostats is rotatably affixed to the heliostat chassis which comprises a support frame 6, a plurality of supports 10 spanning the width of the chassis, and a plurality of stantions 9 atop the supports 10 for mounting the mirrors 3.

In the preferred embodiment, each of the mirrors 3 has a mirror positioning arm 4 rigidly affixed to the back surface of the mirror 3. Each mirror positioning arm 4 is oriented perpendicularly to the associated mirror 3 at the point of contact at the center of the back surface. Each combination of mirror 3 and positioning arm 4 is rotatably coupled to the chassis by means of a primary articulated joint positioned at the proximal end of the positioning arm 4 in proximity to the point of attachment to the backside of the mirror 3. The distal end of the positioning arm 4, in turn, is rotatably coupled to the positioning plate 5 by means of a secondary articulated joint, preferably a ball joint or universal joint, that permits the positioning arm 4 to rotate as the positioning plate 5 is displaced via a rotational or translational motion. The secondary articulated joint may also permit the positioning arm 4 to slide in the direction of its longest axis, thereby enabling the positioning plate 5 to move closer to or further away from the associated mirror 3 as the positioning plate is displaced to track the sun.

Figure 2:
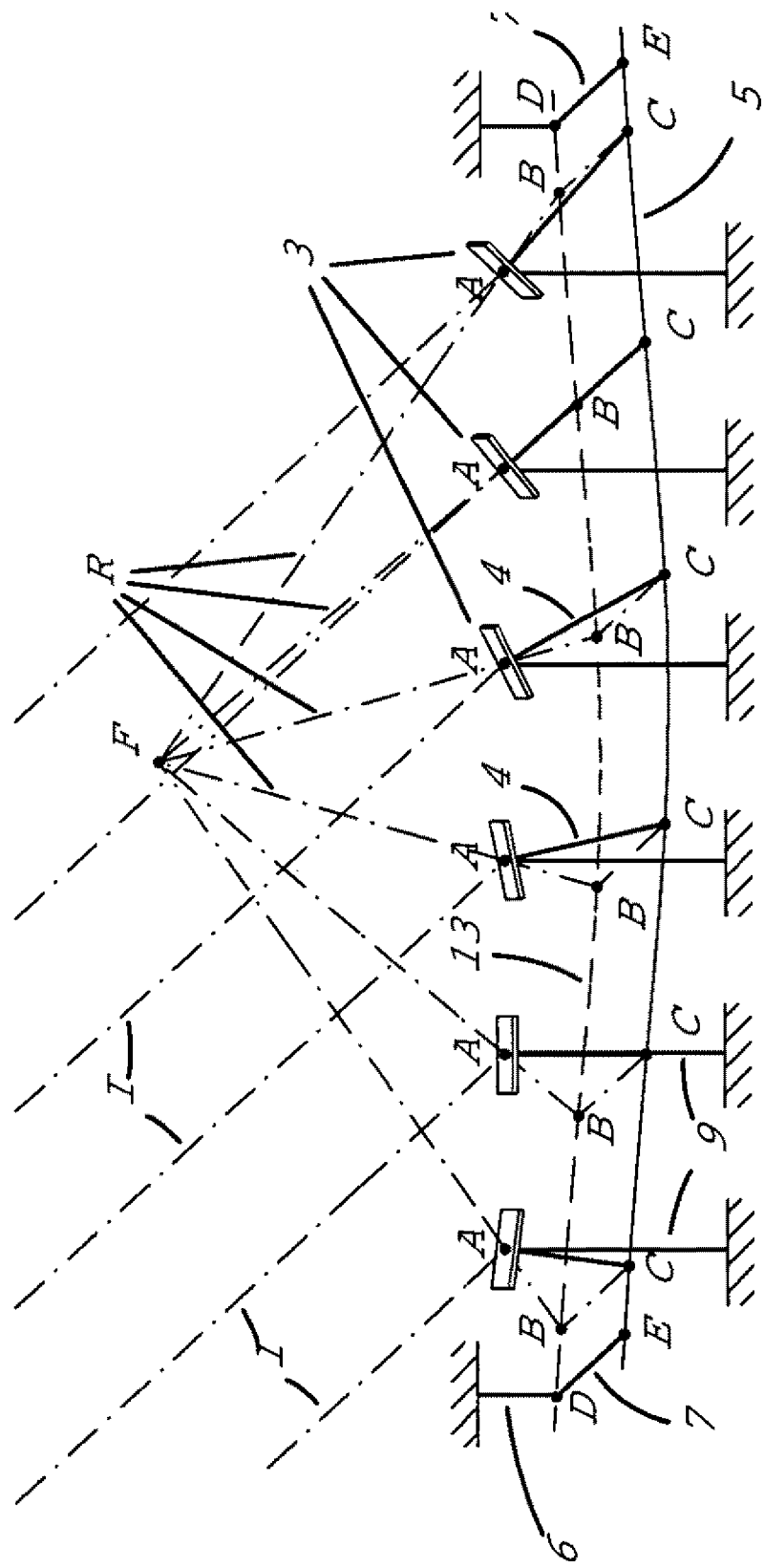
FIG. 2 is a schematic side view of the heliostat, in accordance with the preferred embodiment.

Illustrated in FIG. 2 is a schematic view of the heliostat array including the receiver and a co-planar array of siderostats. As can be seen, the plurality of mirrors 3 is oriented so as to reflect the parallel incoming rays, I, and direct all reflected rays, R, to a common focal point, F, coinciding with the receiver. The orientation of the mirrors 3 is controlled by the positioning plate 5 via the positioning arms 4. The positioning arms 4 are schematically represented by the resultant line segments, AC, where each point A schematically represents the center of rotation of a mirror 3 and its associated positioning arms 4 relative to heliostat chassis. Each point C schematically represents the center of rotation of each positioning arm 4 relative to the positioning plate 5.

Each of the mirrors 3 rotates about its center of rotation at point A in response to the displacement of the positioning plate 5 which exerts a torque on the distal end of each positioning arms 4. In the preferred embodiment, the positioning plate 5 is mounted to the chassis by means of one or more linkages including swing arms 7. Each of the swing arms is rotatably attached to the chassis 6 means of first hinge D and rotatably attached to the positioning plate 5 by means of a second hinge E. The first hinges D and second hinges E are preferably ball joints or universal joints allowing the positioning plate 5 to swing about two orthogonal axes.

In accordance with the teachings of the preferred embodiment, the distance between the positioning plate 5 and each mirror 3 in a direction normal to the mirror is schematically illustrated by line segment AC. The length of the segment AC is selected to be the magnitude of a resultant vector equal to the sum of two vectors, wherein the first vector and the second vector have the same magnitude. The first unit vector of the two vectors, coinciding with a ray schematically represented by the segment AB, points from an individual mirror 3 to the focal point F coinciding with the receiver. The point A therefore lies on the line segment FB, such that the segment AB is parallel to the reflected rays R. The second vector of the two component vectors points to the radiation source and is schematically represented by the segment BC. The length of the two component vectors are equal and thus form an isosceles triangle ABC with the sum vector spanning segment AB as the base.

The line segments BC are substantially parallel to one another for a distant radiation source. When the length of the swing arms 7 is made equal to the magnitude of the first and second vectors, each of the positioning arms 4 is adapted to coincide with the base of an isosceles triangle ABC for each siderostat for any orientation of the position plate 5. Thus, when the swing arms 7 are oriented parallel to the incident rays, each of the positioning rods 4—as defined by the distance between the first center of rotation A and the second center of rotation C—is oriented in a direction that bisects the interior angle between a source vector pointing to the sun and a receiver vector pointing from the associated mirror 3 to the focal point F.

If the plurality of mirrors 3 are co-planar, and all mirrors 3 share a common focal point F, the contour of the positioning plate 5 adapted to intersect each of the secondary centers of rotation, i.e., the points about which the positioning arms 4 rotate about the positioning plate 5, is given by the Conchoid of Nicomedes. For a two-dimensional array of mirrors 3, the shape of the positioning plate 5 is given by the Conchoid of Nicomedes surface of revolution represented in parametric form by:

$$\vec{x} = \left\{ u\left(1 + \frac{d}{r}\right), v\left(1 + \frac{d}{r}\right), -\frac{h}{r} \right\} \quad [1]$$

where u, v, are the position variables in a Cartesian coordinate system and $$r = \sqrt{u^2 + v^2 + h^2}. \quad [2]$$

The variable h is the perpendicular distance of the focal point at point F from the plane that contains all the centers of rotation at represented by points A. The variable d is the length of the swing arm 7 which is substantially equal to the length of the segment AB. The axis about which the Conchoid of Nicomedes is revolved intersects the focal point F and is perpendicular to the plane defined by the primary centers of rotation, i.e., each point A.

One skilled in the art will appreciate that the positioning plate 5 having the shape of the Conchoid of Nicomedes surface of revolution permits the positioning plate to simultaneously point each of the mirrors such that the reflected rays R for each mirror 3 is directed to the same focus for any position of the sun. Moreover, all of the mirrors 3 may be simultaneously re-oriented to track the movement of the sun by simply swinging or otherwise rotating the positioning plate 5 such that the swing arms 7 are parallel with the incident rays I.

Figure 3:
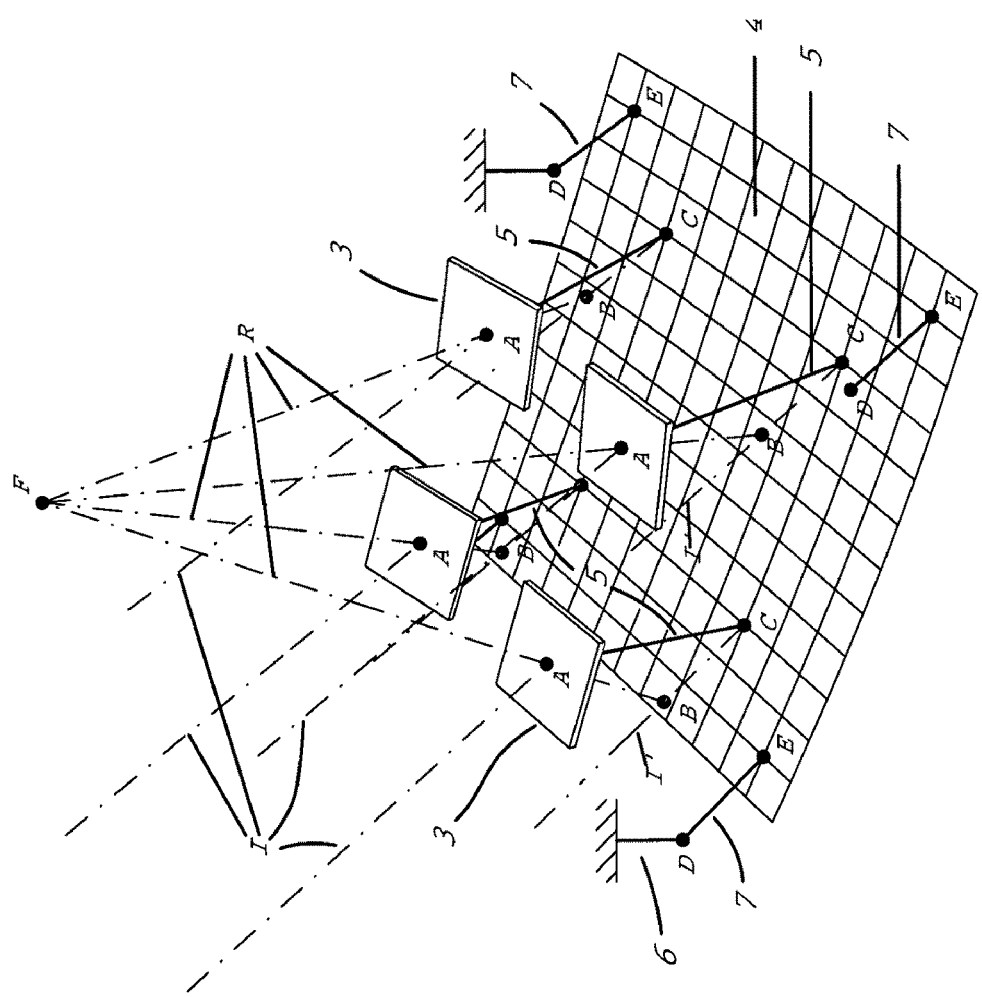
FIG. 3 is schematic perspective view of the heliostat, in accordance with the preferred embodiment.

Illustrated in FIG. 3 is an schematic perspective view of the heliostat array including a co-planar array of four siderostats adapted to reflect radiation between a distance source of incident radiation I and a receiver (not shown) at the focal point F. As in FIG. 2, each of the plurality of mirrors 3 is adapted to rotate about the primary center of rotation at point A in accordance with the movement of the positioning plate 5. The distance between each mirror 3 and the point of attachment of the associated positioning arm to the positioning plate is given by the vector sum of two component vectors, each of the vectors having a magnitude equal to the length of the swing arm 7 between its points of rotation schematically represent by points D and E. The first of the two component vectors coinciding with segment AB indicates the direction of the focal point relative to the mirror while the second component vector coinciding with segment BC indicates the direction of the source.

Figure 4:
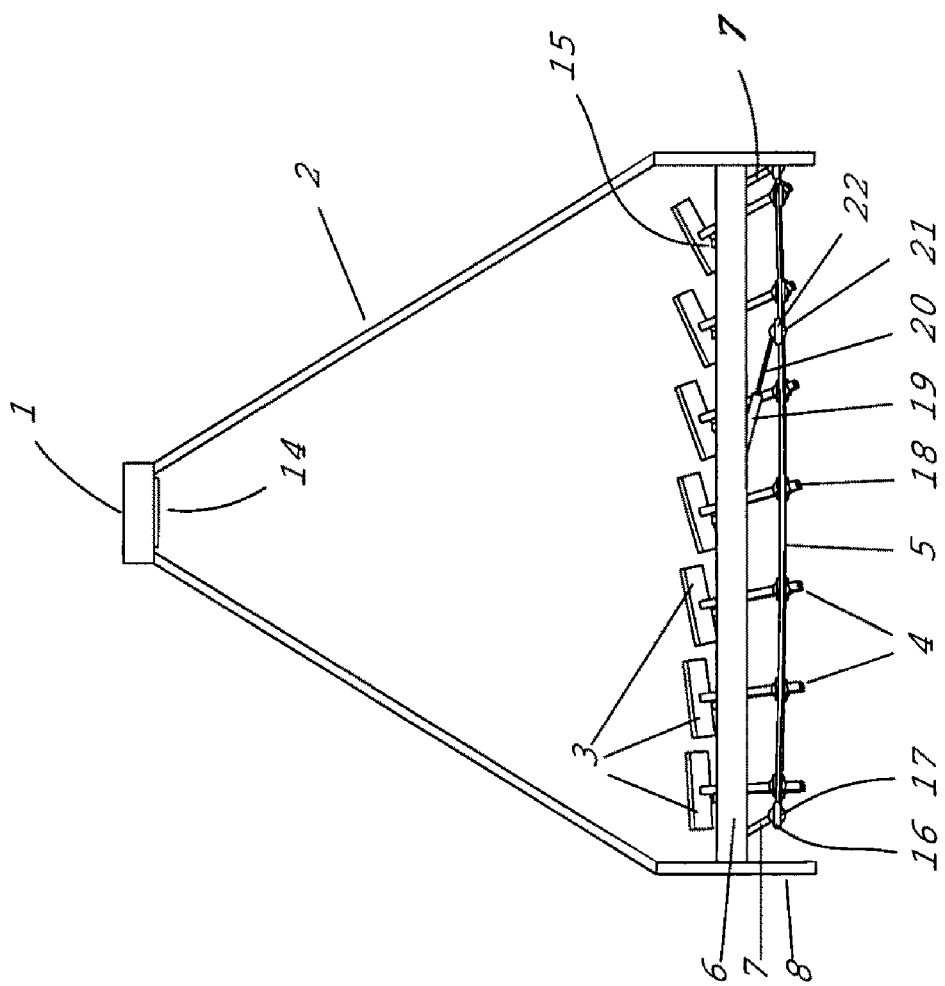
FIG. 4 is a side view of the heliostat, in accordance with the preferred embodiment.

Illustrated in FIG. 4 is a side view of an exemplary heliostat array. Each of the plurality of mirrors is oriented so as to bisect the interior angle between an incident ray I and reflected ray R directed to receiver 14. To account for diurnal movement of the source as well as seasonal changes in the declination of the sun, preferably the heliostat is adapted to continuously or continually track movement of the source and alter the position of the positioning plate 5 accordingly. The positioning plate 5 is positioned using at least one, preferably two, actuators that drive the positioning plate 5 to swing relative to the chassis about one, preferably two, orthogonal axes. Each of the one or more actuators (not shown), which may include a servo or stepper motor, for example, are operably coupled to the positioning plate 5 by means of a frame actuator arm 19, a positioning plate actuator arm 20, and an articulated joint including joint ball 21 and ball socket 22.

A. Camera Alignment

Figure 5:
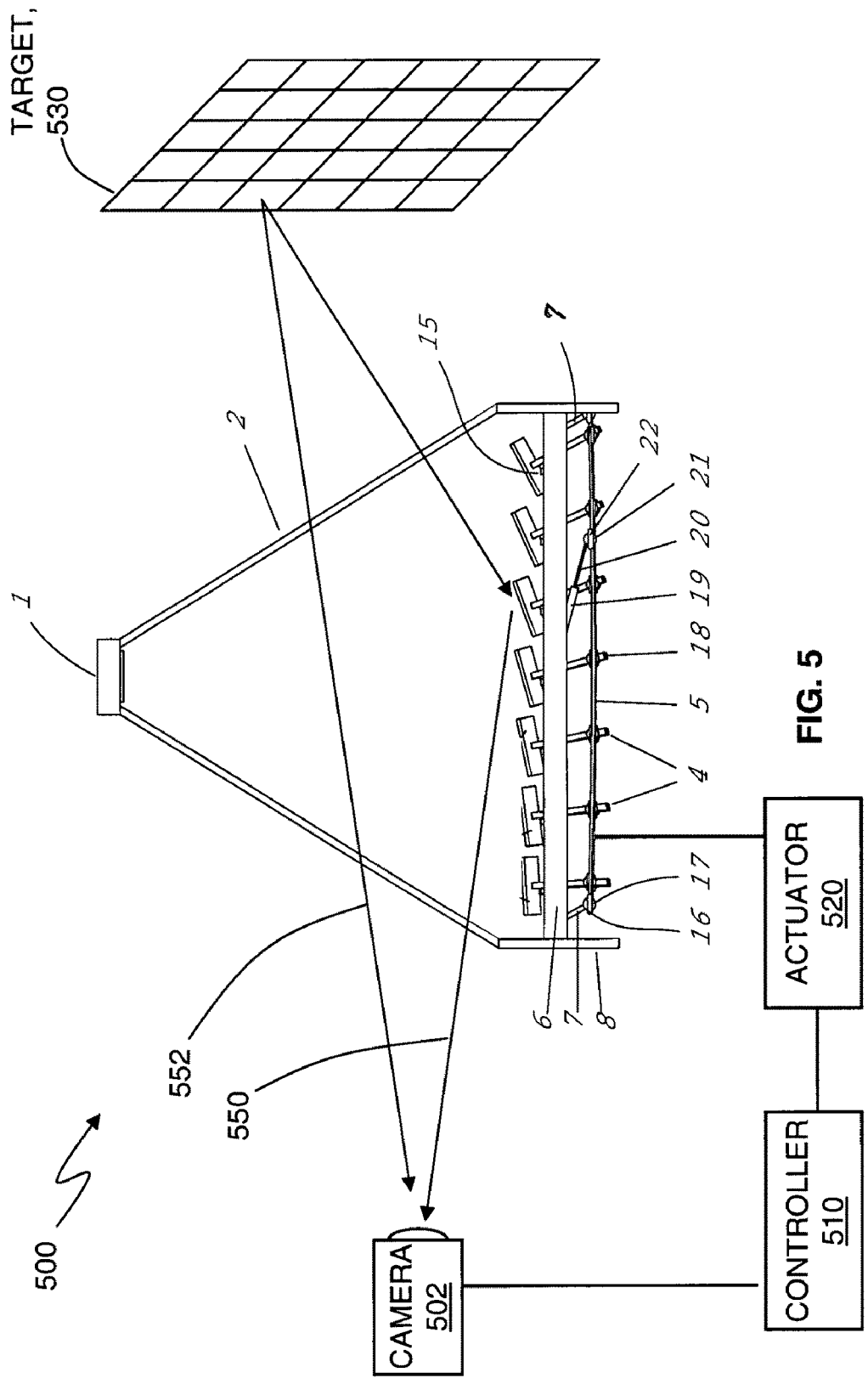
FIG. 5 is side view of the heliostat with an alignment camera directed to a reference target, in accordance with the preferred embodiment.

Illustrated in FIG. 5 is a side view of a solar concentrator with an alignment camera for implementing camera-based alignment of the mirrors. The concentrator 500 includes a heliostat with a plurality of mirrors, one or more digital cameras 502 coupled to an alignment controller 510, and one or more calibration targets or reference targets 530. A camera 502 and reference target 530 are generally mounted in predetermined positions on either side of the array of mirrors 3 to enable the camera to capture images of the reflections of the target. The image is transmitted to the alignment controller where the image is processed to determine the orientation or position of one or more mirrors. The observed position may then be used to estimate the error between the mirrors' actual orientation and the intended orientation. In some embodiments, the camera 502 may also have a direct view 552 of the target 530 in addition to the reflection 550, thereby allowing the alignment controller to register the position of the target without the need to place the target in a predetermine position. The reference target preferably includes graphical indicia—in the form of one or more monochromatic or color markers, images, or objects—from which the mirror alignment controller 510 may determine the orientation of one or more mirrors with precision sufficient to align the mirrors. The process of aligning the mirrors may occur during manufacture of the heliostat array or anytime thereafter.

In the preferred embodiment, there is one alignment camera 502 associated with each reference target 530. While a single camera 502 and reference target 530 may be sufficient to orient the mirrors 3 of some concentrators, multiple cameras may be necessary with some concentrator arrays due to the fact that some closer mirrors may obstruct the view of more distant mirrors. Multiple cameras, or a single camera used to take images from multiple positions, may be also be used to collect multiple images from which estimates may be determined and combined to increase speed and accuracy of the orientation measurements.

Figure 6B:
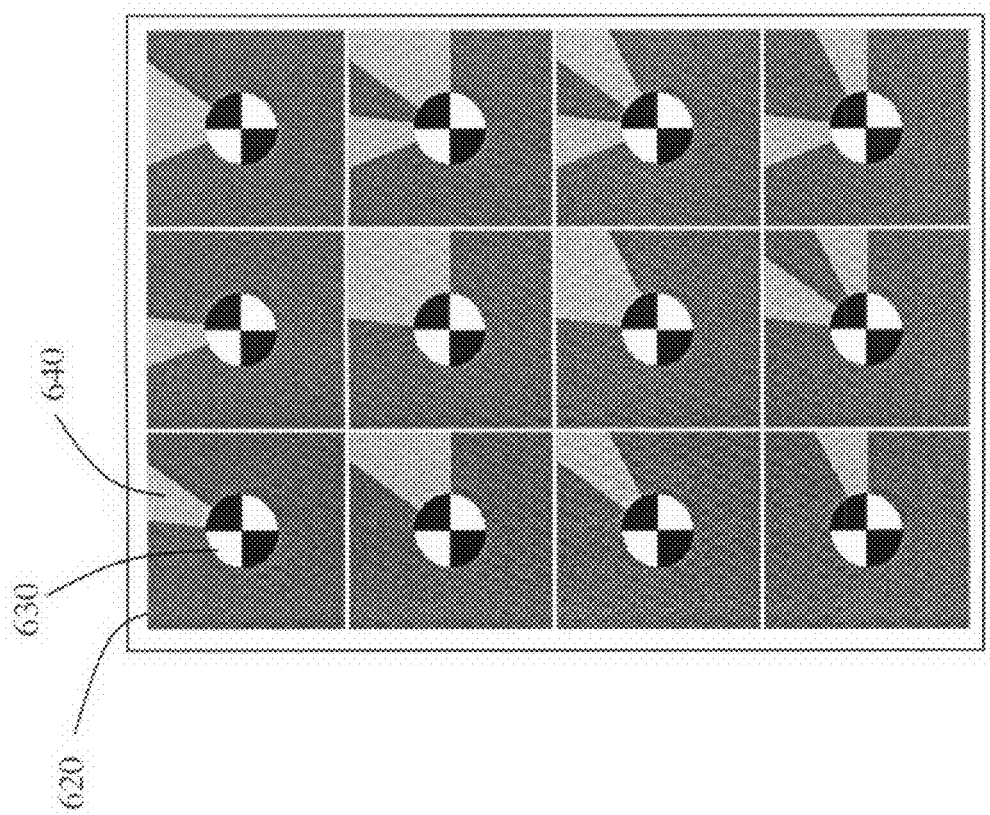
FIGS. 6A and 6B are exemplary reference targets employed to align the solar concentrator mirrors, in accordance with a preferred embodiment.
Figure 6A:
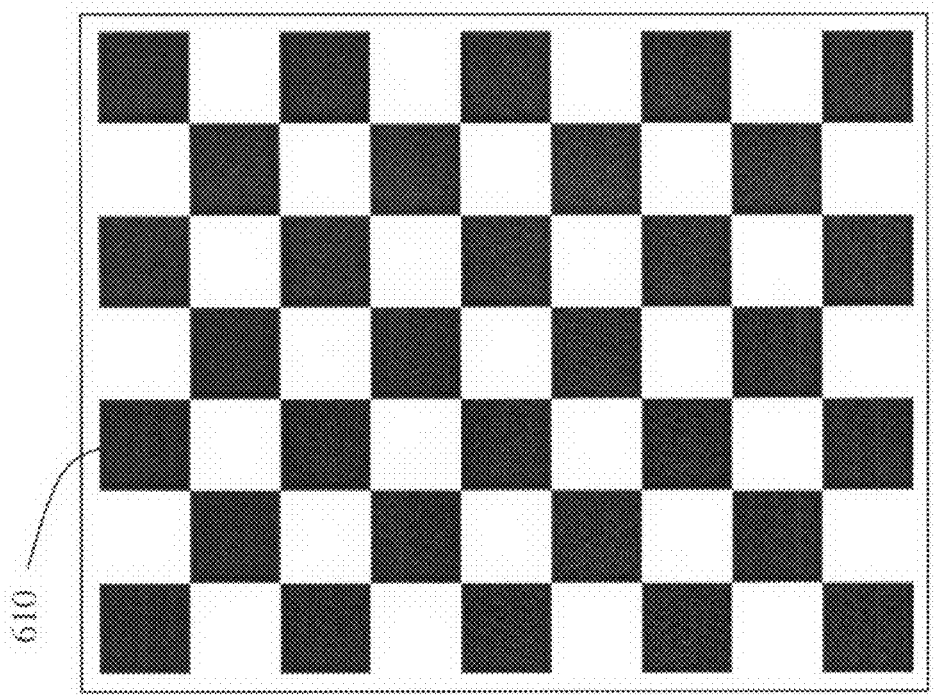

As illustrated in FIGS. 6A and 6B are exemplary targets with which the plurality of mirrors 3 may be aligned. The checker pattern in FIG. 6A is one example of a monochromatic target having a high-contrast pattern of polygons, e.g., squares 610, whose reflection can indicate the alignment or misalignment of the mirror from which the reflection is observed. The target pattern in FIG. 6B is a two-dimensional grid of markers, fiducials, or other reference points including, for example, the corner features from which alignment controller can register the position of the marker. Each marker preferably includes a crosshair or other high-contrast image with which the alignment controller can readily discern the orientation of the target as it appears in a reflection. Each marker may further include indicia uniquely associated with a position in the grid pattern. In the preferred embodiment illustrated, each marker includes a radial spoke whose angular width indicates the position of the marker on the two-dimensional grid. One skilled in the art will appreciate that other patterns including alphanumeric characters, bar codes, and geometric shapes may also be employed to uniquely identify a marker.

When using a reference target with a checker pattern, for example, the position of the squares 610 and orientation of checker pattern from the reflection can be compared to a reference position and orientation for the same configuration of concentrator, camera, and target. The comparison preferably yields an estimate of a mirror alignment error that may, in turn, be used to signal the actuator 520 and thereby minimize the error. In the alternative, the orientation of a mirror may be analytically derived from the position and orientation of the checker pattern observed from the reflection, and the derived orientation compared to the expected mirror orientation to produce an alignment error estimate.

Illustrated in FIG. 7 is an exemplary image of the checkerboard target 710 and the reflection 720 of the target acquired from the array of mirrors 3. The reflection 720 captured from the various mirrors include a plurality of checkers whose size and orientation varies depending on the propagation distance from the target 530 to camera 502 as well as the orientation of the associated mirror 3. The size and orientation of the checkers in the reflection may be compared to the expected size and orientation of the same checkers determined for the same configuration of camera and target and heliostat positioning plate. In particular; the determined orientation may then be compared to the expected orientation for each individual mirror for purposes of determining the alignment error of each mirror. The alignment error in turn may be used to properly calibrate each mirror to maximize the collection efficiency of the entire concentrator.

When the reference target includes a plurality of unique fiducials as shown in FIG. 6B, the target and one or more cameras are positioned on either side of the array of mirrors such that each camera can view a reflection of at least one and preferably a plurality of fiducials in each of the mirrors. To test whether a mirror is properly oriented, the reflections of the fiducials are imaged, identified, and their positions in a reflection compared against the expected position of the same fiducials when the mirror is properly oriented. The expected positions may be analytically derived or retrieved from a database including the positions of the same one or more crosshairs. When a mirror is out of alignment, the crosshairs in the reflection will appear to be shifted or displaced from the correct position of the crosshairs. Assuming that the resolution of the reflected image is high enough, the discrepancy between the expected position and observed position of one or more crosshairs may be used to generate a quantitative measure of the error and the appropriate alignment corrections where applicable.

In some embodiments, one or more of the cameras are positioned such their field-of-view includes the reference target 530 as well at least a portion of the array of mirrors 3. Using the acquired image cross-hair in combination with the reflected image of the same crosshair, the alignment controller may readily compute the relative angle and distance between the crosshair and its reflection, thereby improving the accuracy of the alignment error estimate.

In some embodiments, a single camera is used to acquire reflections of the reference image. Where the acceptance angle of the concentrator is high and the angular range over which the mirrors are adapted to sweep is large, it may be necessary to move the camera or employ multiple cameras to ensure that all mirrors may be viewed at each mirror position tested. As one skilled in the art will appreciate, one or more mirrors may be partially or completely obscured, for example, where a mirror in closer proximity to the camera 530 rotates up and blocks the line of sight to the mirrors on the opposite side, or where the rotation of a mirror exposes its non-reflective underside to the camera. Multiple images acquired from one or more cameras may also be captured and combined in a weighted combination, for example, to produce a more accurate alignment error estimate. The weights may be tailored for each mirror and selected to reflect the accuracy of each individual error estimate, i.e., a relatively large weight selected where the camera views a mirror edge-on and a relatively low weight selected where the camera is substantially orthogonal to the mirror.

Depending on the configuration of a heliostat and whether the mirrors are independently controllable, it may be necessary to verify that the mirrors are properly oriented over their entire angular range. In such cases, images of the mirrors may be captured at a plurality of mirror orientations over successive intervals. An alignment error estimate may be generated for each mirror over its range of motion and the appropriate adjustments made to align each mirror or system of mirrors.

While the camera-based mirror alignment described above is implemented in combination with one or more reference targets, camera-based mirror alignment may also be implemented without targets using edge detection techniques to identify structures of the heliostat from which the alignment of the mirrors may be determined. As illustrated in FIG. 8, the alignment camera 502 may be employed to take an image including one or more mirrors 3 of the array. The image is then processed by the alignment controller 510 to produce a two-dimensional spatial gradient magnitude image using a Sobel operator, for example. The gradient magnitude image emphasizes or otherwise extracts the side edges of the substantially planar mirrors. The individual mirrors may then be identified and their positions compared to their reference positions, or the positions of all the mirrors simultaneously compared to a reference image of the concentrator when properly aligned. Thereafter the mirrors may be re-oriented to reduce the alignment error between the observed orientations and the reference orientations until an error threshold is reached or the error reduced to a minimal level.

B. Camera Tracking

Figure 9:
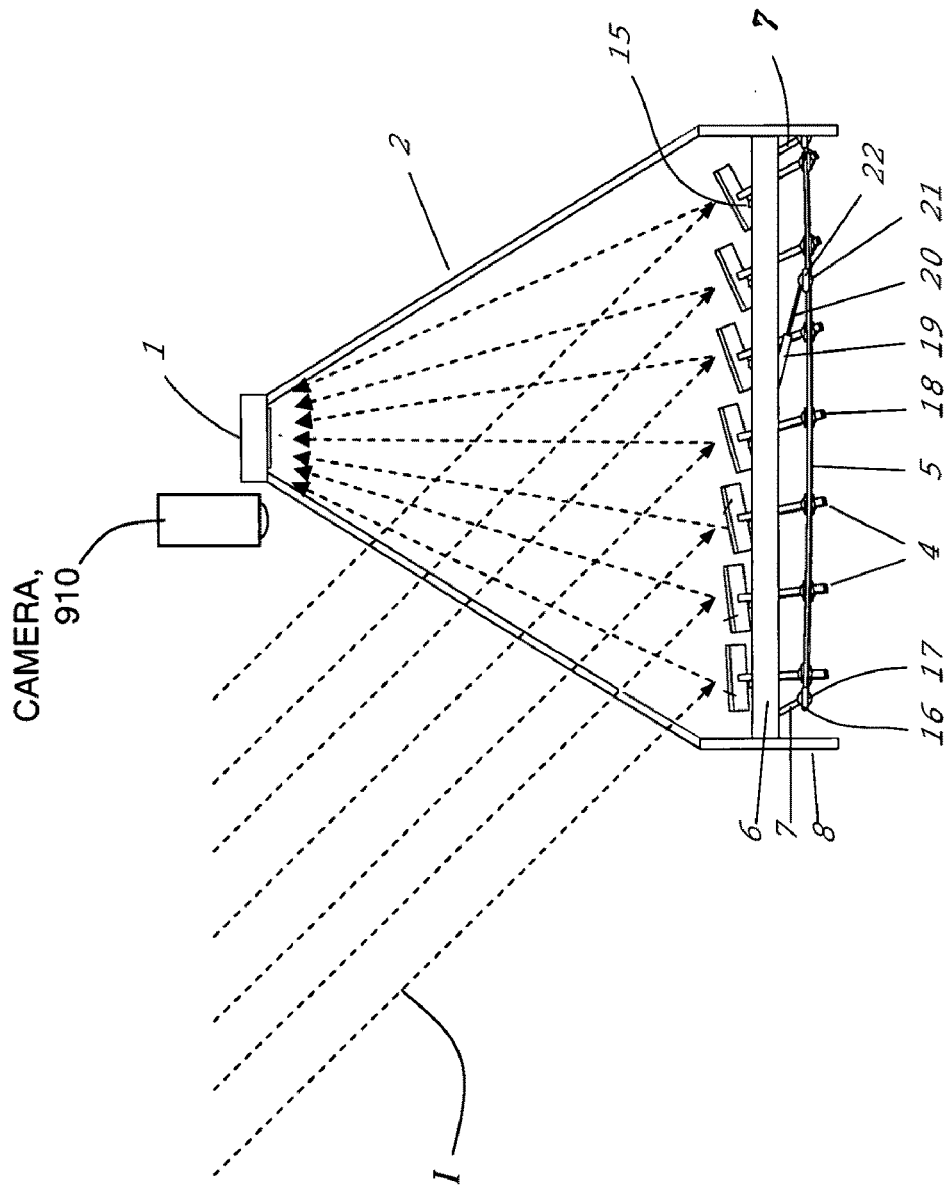
FIG. 9 is a side view of a heliostat with a tracking camera, in accordance with a preferred embodiment.
Figure 10:
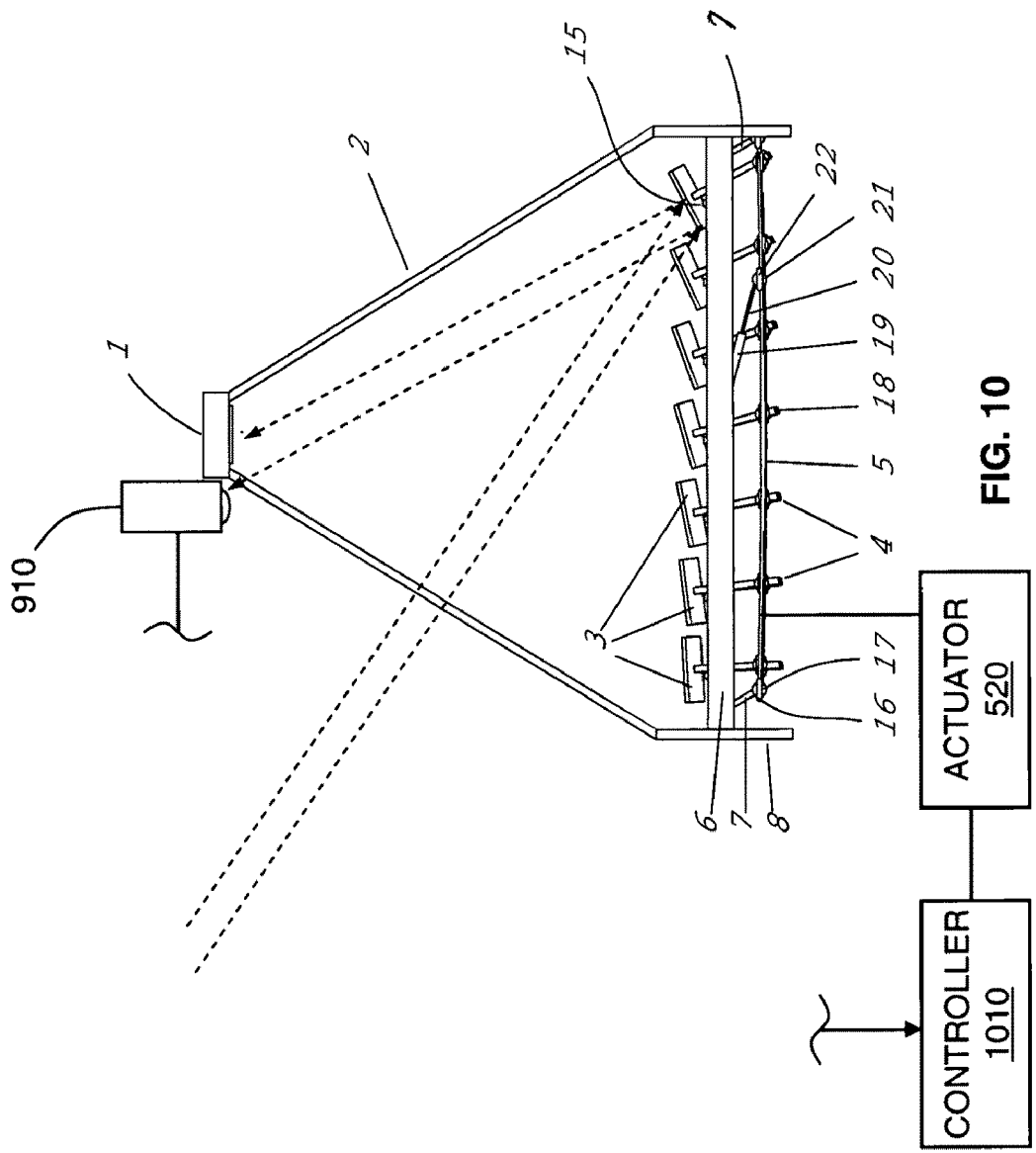
FIG. 10 is a side view of a heliostat depicting the reflections of the sun as observed by the receiver and a tracking camera, in accordance with a preferred embodiment.
Figure 11:
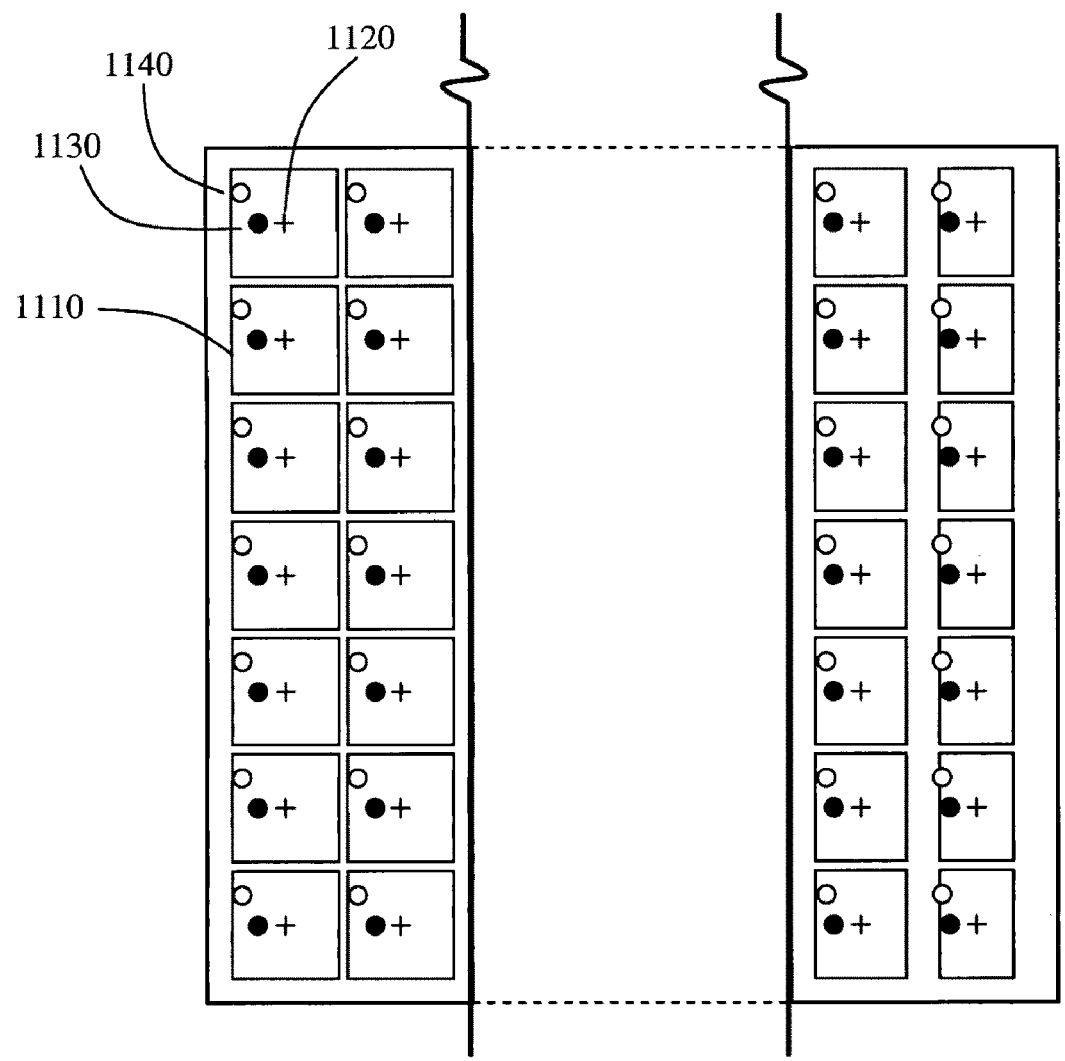
FIG. 11 is a schematic illustration of an image of a plurality of mirrors as observed by a tracking camera, in accordance with a preferred embodiment.

After the array of mirrors has been calibrating using the alignment camera 530, the same or different camera may be used to continuously guide the mirrors and track the source of illumination, typically the sun, over time. Referring to FIGS. 9 through 11, a tracking camera 910 is positioned in proximity to the focal point of the array of mirrors, i.e., the photovoltaic receiver 1. The tracking camera 910 periodically captures images of at least one mirror 3 and the reflection of the sun therein. The location of the sun as it appears in the reflection of a given mirror may then be used to determine whether to re-orient or re-align the mirrors to properly track the sun. As illustrated in FIG. 9, all the mirrors work in concert to reflect incident radiation, I, when each individual mirror is properly oriented in a direction that bisects the interior angle between a vector pointing to the sun and a vector pointing to the receiver. At the proper angle, the reflection of the sun appears at the center of each mirror with respect to the receiver. As illustrated in FIG. 10, however, the reflection of the sun appears displaced from the center of each mirror with respect to the tracking camera 910. The position of the sun in the reflection of one or more mirrors, as observed by the tracking camera 910, may then be used to estimate the deviation between the actual and expected orientation of one or more mirrors. If the deviation exceeds a predetermined threshold, the tracking controller 1010 may drive the one or more actuators 520 to adjust the orientation of the mirrors and minimize the tracking error.

Illustrated in FIG. 11 is a schematic depiction of the array of mirrors as viewed from the tracking camera 910. The center of each mirror is represented by a cross-hair while the expected position of the sun's reflection as observed by the tracking camera when the mirror is properly aligned is represented by a black dot. When a mirror is out of alignment, the position of the sun's reflection observed in the mirror appears displaced from the associated expected position illustrated by a white dot. Using the image captured from the tracking camera 910, the observed position of the sun may be compared to the expected position, and the mirrors re-oriented to minimize the deviation between there between. The frequency with which the tracking camera 910 captures images and the mirrors re-aligned to track the sun is preferably between 1 second to 5 minutes.

Figure 12:
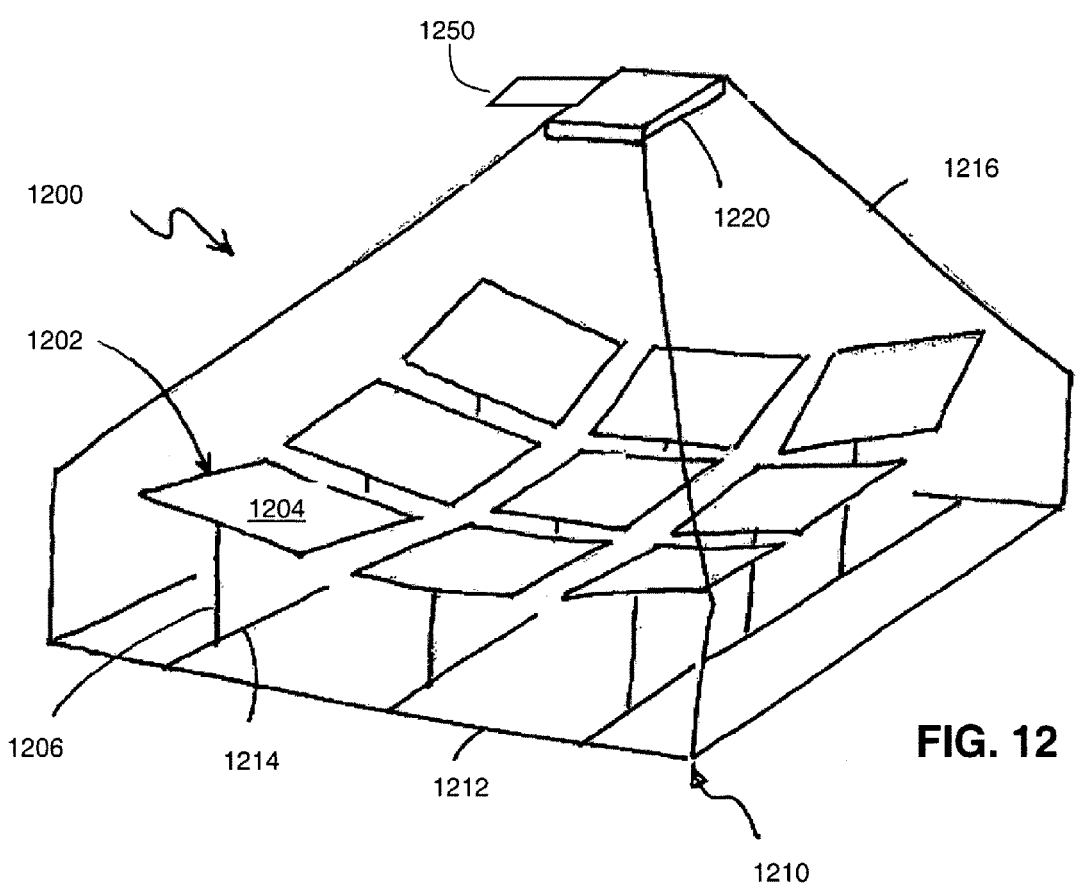
FIG. 12 is a perspective view of a solar concentrator with an array of heliostat assemblies, in accordance with the first preferred embodiment of the present invention.

Illustrated in FIG. 12 is a solar concentrator having a cable drive and camera tracking. The solar concentrator 1200 in this exemplary embodiment includes an array of heliostat assemblies 1202, each assembly being adapted to redirect incident sunlight to a receiver 1220. The orientation of the heliostat assemblies 1202 are varied over the course of a day and, preferably, over the course of the year in order to continually reflect or refract sunlight to the receiver 1202 during daylight hours. In this embodiment, the heliostat assemblies 1202 are reoriented with one or more actuators (not shown) coupled to the assemblies via one or more cables or wires (not shown) in accordance with the alignment determination made by a camera 1250 and tracking unit (not shown). The length of the cables may be customized to depend on the distance between the actuators and the heliostat assemblies 1202. As one skilled in the art will appreciate, the cables enable one to remotely locate, and therefore protectively conceal, the actuators separately from the heliostat assemblies themselves.

Referring to FIG. 12, the heliostat assemblies 1202 in the exemplary embodiment include mirrors 1204 or other reflective surfaces rotatably mounted to stations or posts 1206. Each of the plurality of posts 1206 is in turn connected to a base or frame that includes a chassis 1212, a plurality of support beams 1214, and bracing 1216 to hold the receiver 1220 in fixed relation to the plurality of heliostat assemblies 1202. Each of the heliostat assemblies 1202 is then individually oriented using a plurality of actuators (shown in FIGS. 13-14) to reflect incident sunlight, for example, to the receiver 1220. One skilled in the art will appreciate that a solar concentrator in other embodiments may include translucent lens, e.g., convergent lenses or Fresnel lenses, to refract light onto a receiver located on a side of the array of heliostats 1202 opposite the sun or other optical source. While the first preferred embodiment is intended to concentrate optical light, one skilled in the art will also appreciate that the present invention may also be applied to concentrate or to transmit energy at other wavelengths within the electromagnetic spectrum with appropriate modification to the receiver and reflective surfaces, for example.

Figure 13:
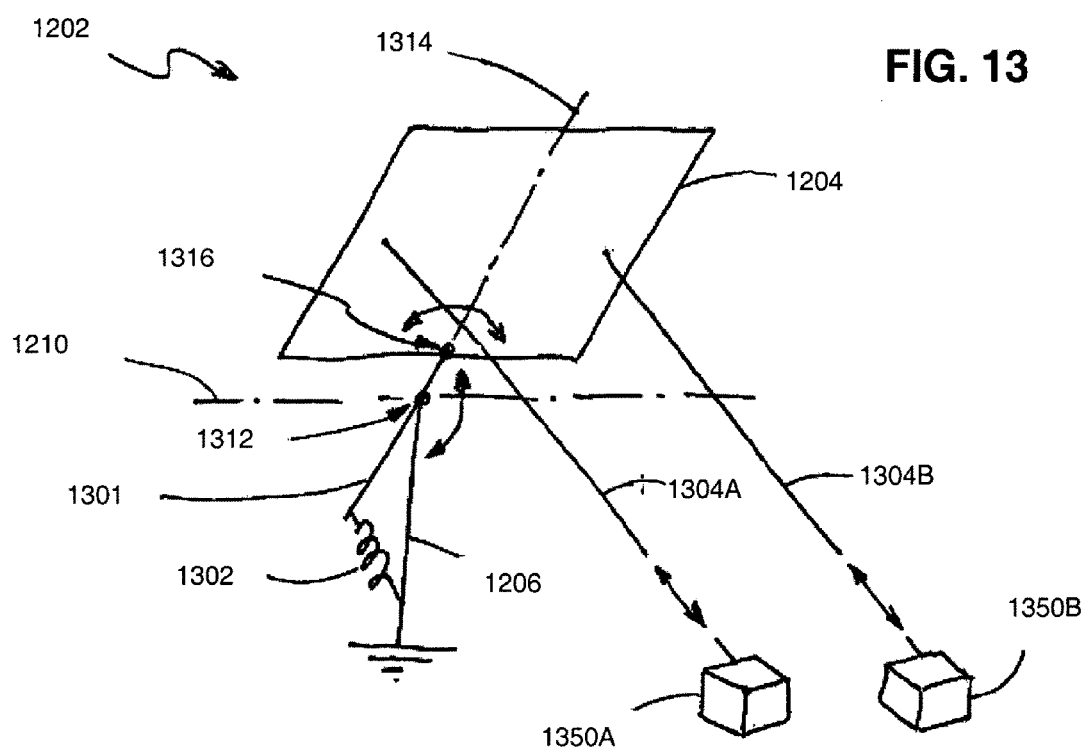
FIG. 13 is a schematic illustration of an individual heliostat assembly having a plurality of cable drives, in accordance with the first preferred embodiment of the present invention.

Illustrated in FIG. 13 is a schematic illustration of an exemplary heliostat assembly 1202. The mirror 1204 is adapted to rotate with respect to the post 1206 about two orthogonal degrees of freedom. The mirror 1204 may rotate about a first axis 1310 using a first hinge 1312, and rotate about a second axis 1314 using a second hinge 1316. The heliostat assembly 1202 may further include a biasing mechanism such as a rigid extension 1301 and coil spring 1302 to induce a torque that draws the mirror to a home position oriented substantially vertically, i.e., substantially upright and co-parallel to the post 1206. The mirror 1204 may then be reoriented in response to the tracking controller by selectively varying the tension applied to wires or cables 1304A, 1304B affixed to the left and right sides of the mirror 1204. The elevation angle associated with the mirror 1204 may be varied, for example, by pulling both the cables 1304A, 1304B in unison against the force of the spring 1302, thus causing the mirror 1204 to rotate about the horizontal axis 1310. When reeling both cables 1304A, 1304B in or out at the same rate, the mirror pivots about the first axis 1210 but not the second axis 1314. The azimuth angle may be varied, for example, by retracting one of the two cables 1304A, 1304B while unreeling or otherwise releasing the other cable, thus turning the mirror about the second axis 1314. As one skilled in the art will appreciate, the tension in the cables can be dynamically varied to adjust both the elevation and azimuth angles simultaneously to track the sun. In the preferred embodiment, one or more actuators 1350A, 1350B are used to vary the tension on the cables 1304A, 1304B and/or vary the length of the cable segments between the mirror and actuators).

Figure 14:
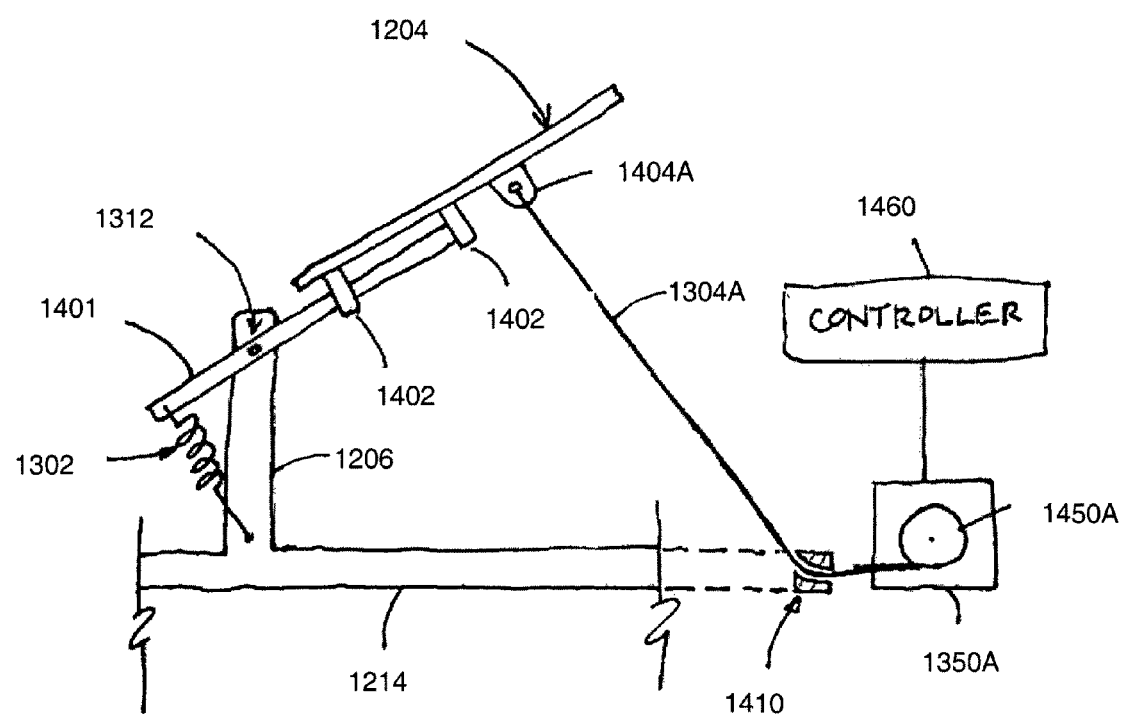
FIG. 14 is a side elevational view of a heliostat assembly having a plurality of cable drives, in accordance with the first preferred embodiment of the present invention.
Figure 15:
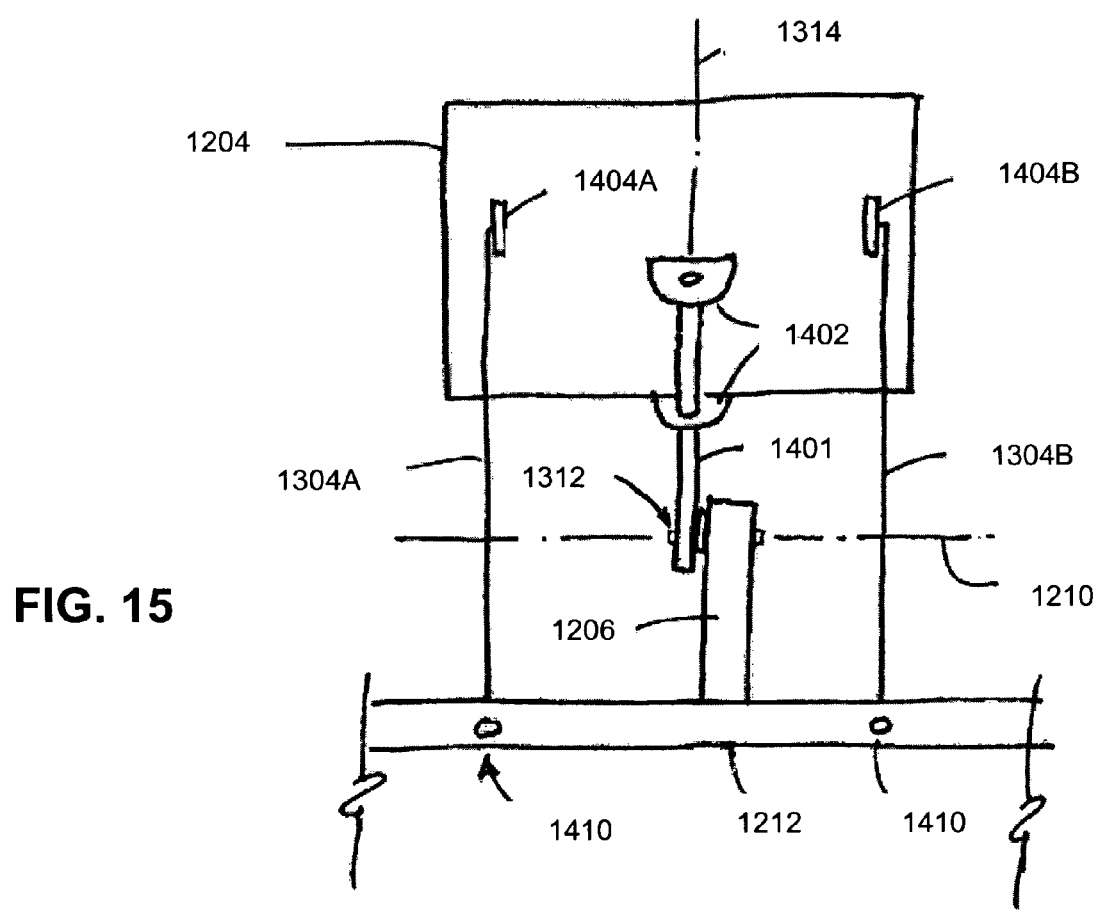
FIG. 15 is a rear elevational view of a heliostat assembly having a plurality of cable drives, in accordance with the first preferred embodiment of the present invention.

Illustrated in FIG. 14 and FIG. 15 is a side elevational view and rear elevational view, respectively, of the heliostat assembly 1202 of the preferred embodiment. The mirror 1204 shown in profile is rotatably coupled to the support member 1401, i.e., a neck, by means of one or more hinges 1402, i.e., brackets with apertures that receive corresponding cylindrical portions of the support member 1401. The support member 1401, in turn, is rotatably coupled to post 1206 by means of another hinge including a pin 1312, for example.

The heliostat assembly 1202 of the preferred embodiment may further include one or more wires or cables 1304A, 1304B indirectly coupling the mirror 104 to the one or more actuators 1350A, 1350B. The cables 1304A, 1304B are preferably affixed to the non-reflective side of mirror 1204 on either side of the second axis 1314 of rotation using brackets 1404A, 1404B. The cables 1304A, 1304B are also affixed to one or more reels or pulleys 1450 coupled the actuators 1350A, 1350B. Actuation of the pulleys 1450A cause the cables 1304A, 1304B to either retract or unwind depending on the direction of rotation, which is regulated by a controller 1460 to optimize solar reception. The cables 1304A, 1304B may in some embodiments be strung through one or more bores, e.g., apertures 1410, in the frame or chassis 1212 with a rounded profile or angled profile to reduce friction and inhibit the cables from binding or kinking.

With the cables 1304A, 1304B strung through the apertures 1410, the actuators 1350A, 1350B may be placed in a wide variety of locations relative to the heliostat 1202 without altering the relationship between the mirror 1204 and associated cables 1304A, 1304B. As such, the actuators 1350A, 1350B may be conveniently located on a supporting surface like a roof, for example, apart from the heliostat 1202 without altering the operation of the tracking functions of the concentrator 1200. Cables with some flexure also serve to dampen wind loading or other shock transmitted from the heliostat to the actuators 1350A, 1350B, thus minimizing the probability of damage to the actuators.

One skilled in the art will appreciate that the biasing mechanism in the preferred embodiment biases the mirror 1204 in an upright position while still permitting deflection of the mirror in the opposite the direction of the force applied by the biasing mechanism. The mirror is therefore adapted to comply with the force of wind or weight of snow, for example, by folding back and down without any damage to the concentrator 1200. Instead of the spring 1302 illustrated in FIG. 14, the biasing mechanism may also incorporate or otherwise rely on a biasing force from, for example, a torsion spring, a coil spring or compressive spring pushing upward on extension 1301, a tension spring pulling upward on extension 1301, one or more magnets pushing or pulling the mirror upward, the weight of the mirror 1204 itself to serve as a counterweight against the force applied by cables pulling the mirror upward, a ballast weight directly or indirectly affixed at the distal end of the extension 1301 or mirror to apply the appropriate biasing force to raise the mirror 1204, or a combination thereof.

The camera-based tracking controller 1460 in the preferred embodiment regulates the angle of deflection induced in the mirror 1204 depending on one or more of a plurality of conditions including the position of the associated mirror 1204, the location and orientation of the solar concentrator 1200, the time of day and date, and weather conditions, for example. In some embodiments, for example, the controller 1460 is adapted to stow the plurality of mirrors 1204 in a horizontal configuration when the wind speed exceeds a predetermined threshold, thereby mitigating the chance of wind-induced damage.

The cables 1304A, 1304B in the preferred embodiment include any of a number of flexible elongated members through which tension may be transferred, the set of suitable members including metal cables, aircraft cables, wires, ropes, cords, bands, belts, strings, lace, lines, and tethers. The actuators 1350A, 1350B may include any of a number of devices including motors such as stepper motors, solenoids, hydraulic pumps or rams, and pneumatic pumps or rams, for example. The receiver 1220 of the redirected sunlight or radiation may include one or more photovoltaic cells, heat exchangers, heat engines, turbines, or structures requiring illumination, for example.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

We claim:

1. A solar concentrator comprising:
   a solar receiver for converting solar energy to heat or electricity;
   a plurality of optical elements for directing light to the receiver, wherein the orientation of each of the optical elements is individually adjustable;
   at least one camera for capturing one or more images of the plurality of optical elements; wherein the camera is adjacent to the receiver and outside the line of sight between the receiver and each of the plurality of optical elements, and wherein the camera receives light directly from the plurality of optical elements; and
   a controller configured to:
   a) detect the orientation of each of the plurality of optical elements from the one or more images using edge detection;
   b) determine an orientation error for each of the plurality of optical elements based on the detected orientations; and
   c) automatically orient one or more of the plurality of optical elements to reduce the orientation error of each of the plurality of optical elements below a predetermined threshold.

2. The solar concentrator in claim 1, wherein the one or more optical elements comprise a plurality of mirrors.

3. The solar concentrator in claim 1, wherein the controller is an alignment controller configured to automatically orient said optical elements in accordance with a predetermined orientation.

4. The solar concentrator in claim 1, wherein the controller is a tracking controller configured to automatically orient said optical elements to direct focused sunlight to the receiver.

5. The solar concentrator in claim 1, wherein the controller is configured to automatically orient one or more optical elements if the orientation error exceeds a predetermined threshold.

6. The solar concentrator in claim 1, wherein the camera comprises a video camera.

7. The solar concentrator in claim 2, wherein the plurality of mirrors are adapted to focus light on the receiver.

8. The solar concentrator in claim 2, wherein the at least one camera is configured to capture said images of the plurality of mirrors with reflections of a reference target mounted in a predetermined position in proximity to the solar concentrator.

9. The solar concentrator in claim 7, wherein controller is configured to determine the orientation error based on edge detection.

10. The solar concentrator in claim 9, wherein the edge detection comprises detection of the edges of the plurality of mirrors.

11. The solar concentrator in claim 10, wherein the controller is adapted to detect the edges of the plurality of mirrors based on gradient magnitude.

12. The solar concentrator in claim 8, wherein the reference target comprises one or more fiducials, the position of the fiducial reflections indicating orientation of the mirrors from which the reflections are captured.

13. The solar concentrator in claim 12, wherein the fiducials comprise a plurality of fiducials arranged in a two-dimensional grid oriented substantially perpendicular to the at least one camera.

14. A method of aligning a plurality of mirrors of a solar concentrator comprising one or more cameras, the method comprising:
   capturing at least one image of the plurality of mirrors with the one or more cameras;
   detecting edges from the at least one image;
   determining the orientation of each of the plurality of mirrors from the detected edges;
   determining an orientation error for each of the plurality of mirrors based on the determined orientations of the plurality of mirrors;
   orienting each of the plurality of mirrors for which the orientation error exceeds a predetermined threshold.

15. The method of claim 14, wherein the edges detected from the at least one image comprise the edges of the plurality of mirrors.

16. The method of claim 15, wherein the edges detected from the at least one image further comprise the edges from a reference target reflected by the plurality of mirrors.

* * * * *